US008060504B2

(12) United States Patent
Roegner

(10) Patent No.: US 8,060,504 B2
(45) Date of Patent: Nov. 15, 2011

(54) METHOD AND SYSTEM FOR SELECTING CONTENT ITEMS TO BE PRESENTED TO A VIEWER

(75) Inventor: Michael W. Roegner, Plano, TX (US)

(73) Assignee: Jericho Systems Corporation, Dallas, TX (US)

( * ) Notice: Subject to any disclaimer, the term of this patent is extended or adjusted under 35 U.S.C. 154(b) by 0 days.

(21) Appl. No.: 12/855,308

(22) Filed: Aug. 12, 2010

(65) Prior Publication Data

US 2010/0312741 A1     Dec. 9, 2010

Related U.S. Application Data

(63) Continuation of application No. 10/852,406, filed on May 24, 2004, now Pat. No. 7,792,828.

(60) Provisional application No. 60/482,487, filed on Jun. 25, 2003.

(51) Int. Cl.
*G06F 7/00* (2006.01)
*G06F 17/30* (2006.01)
*G06F 3/00* (2006.01)

(52) U.S. Cl. .......... 707/728; 707/723; 707/748; 725/46; 706/47

(58) Field of Classification Search ................ 707/728, 707/723, 748; 725/46; 706/47
See application file for complete search history.

(56) References Cited

U.S. PATENT DOCUMENTS

| | | | |
|---|---|---|---|
| 5,629,980 | A | 5/1997 | Stefik et al. |
| 5,634,012 | A | 5/1997 | Stefik et al. |
| 5,638,443 | A | 6/1997 | Stefik et al. |
| 5,715,403 | A | 2/1998 | Stefik et al. |
| 5,752,238 | A | 5/1998 | Dedrick |
| 5,754,938 | A | 5/1998 | Herz et al. |
| 5,754,939 | A | 5/1998 | Herz et al. |
| 5,757,917 | A | 5/1998 | Rose et al. |
| 5,761,601 | A | 6/1998 | Nemirofsky et al. |
| 5,768,521 | A | 6/1998 | Dedrick |
| 5,774,170 | A | 6/1998 | Hite et al. |
| 5,781,894 | A | 7/1998 | Petrecca et al. |
| 5,790,426 | A | 8/1998 | Robinson |
| 5,794,210 | A | 8/1998 | Goldhaber et al. |
| 5,796,945 | A | 8/1998 | Tarabella |

(Continued)

FOREIGN PATENT DOCUMENTS

JP     2001184264     7/2001

OTHER PUBLICATIONS

Marquardt, ASP.NET Performance Monitoring, and When to Alert Administrators, updated Jul. 2003, Microsoft Corporation, ASP.NET Technical Articles, 17 pages.

(Continued)

*Primary Examiner* — Hoang-Vu A Nguyen-Ba
(74) *Attorney, Agent, or Firm* — Patton Boggs LLP

(57) ABSTRACT

A rules evaluation engine operable to select optimal content for presentation to the viewer at each presentation opportunity. The engine evaluates segmentation rules associated with each particular content item in parallel, and then selects the best content to be presented. Priorities determined during evaluation sort out which content items will be presented. Real time dynamic enrichment of the decision making context occurs by retrieving additional information required to evaluate the rules. Logging and administrative processes for managing the segmentation rules are also realized.

24 Claims, 6 Drawing Sheets

U.S. PATENT DOCUMENTS

| | | | |
|---|---|---|---|
| 5,796,952 A | 8/1998 | Davis et al. |
| 5,809,242 A | 9/1998 | Shaw et al. |
| 5,838,790 A | 11/1998 | McAuliffe et al. |
| 5,848,396 A | 12/1998 | Gerace |
| 5,848,397 A | 12/1998 | Marsh et al. |
| 5,855,008 A | 12/1998 | Goldhaber et al. |
| 5,870,724 A | 2/1999 | Lawlor et al. |
| 5,893,075 A | 4/1999 | Plainfield et al. |
| 5,913,040 A | 6/1999 | Rakavy et al. |
| 5,918,014 A | 6/1999 | Robinson |
| 5,933,811 A | 8/1999 | Angles et al. |
| 5,937,392 A | 8/1999 | Alberts |
| 5,946,646 A | 8/1999 | Schena et al. |
| 5,948,061 A | 9/1999 | Merriman et al. |
| 5,960,409 A | 9/1999 | Wexler |
| 5,990,927 A | 11/1999 | Hendricks et al. |
| 5,999,912 A | 12/1999 | Wodarz et al. |
| 6,002,393 A | 12/1999 | Hite et al. |
| 6,006,197 A | 12/1999 | d'Eon et al. |
| 6,006,252 A | 12/1999 | Wolfe |
| 6,016,509 A | 1/2000 | Dedrick |
| 6,026,368 A | 2/2000 | Brown et al. |
| 6,029,141 A | 2/2000 | Bezos et al. |
| 6,029,195 A | 2/2000 | Herz |
| 6,044,376 A | 3/2000 | Kurtzman, II |
| 6,049,777 A | 4/2000 | Sheena et al. |
| 6,061,659 A | 5/2000 | Murray |
| 6,078,866 A | 6/2000 | Buck et al. |
| 6,088,451 A | 7/2000 | He et al. |
| 6,119,101 A | 9/2000 | Peckover |
| 6,144,944 A | 11/2000 | Kurtzman, II et al. |
| 6,167,382 A | 12/2000 | Sparks et al. |
| 6,182,050 B1 | 1/2001 | Ballard |
| 6,185,586 B1 | 2/2001 | Judson |
| 6,223,215 B1 | 4/2001 | Hunt et al. |
| 6,236,971 B1 | 5/2001 | Stefik et al. |
| 6,263,364 B1 | 7/2001 | Najork et al. |
| 6,269,361 B1 | 7/2001 | Davis et al. |
| 6,308,175 B1 | 10/2001 | Lang et al. |
| 6,332,163 B1 | 12/2001 | Bowman-Amuah |
| 6,385,592 B1 | 5/2002 | Angles et al. |
| 6,401,075 B1 | 6/2002 | Mason et al. |
| 6,418,433 B1 * | 7/2002 | Chakrabarti et al. ................. 1/1 |
| 6,466,970 B1 | 10/2002 | Lee et al. |
| 6,498,795 B1 | 12/2002 | Zhang et al. |
| 6,505,194 B1 | 1/2003 | Nikolovska et al. |
| 6,584,492 B1 | 6/2003 | Cezar et al. |
| 6,615,251 B1 | 9/2003 | Klug et al. |
| 6,647,388 B2 | 11/2003 | Numao et al. |
| 6,665,838 B1 | 12/2003 | Brown et al. |
| 6,718,551 B1 | 4/2004 | Swix et al. |
| 6,721,748 B1 | 4/2004 | Knight et al. |
| 6,757,662 B1 | 6/2004 | Greenwald et al. |
| 6,782,369 B1 | 8/2004 | Carrott |
| 6,804,659 B1 | 10/2004 | Graham et al. |
| 6,892,181 B1 | 5/2005 | Megiddo et al. |
| 6,892,354 B1 | 5/2005 | Servan-Schreiber et al. |
| 6,983,272 B2 | 1/2006 | Davis et al. |
| 6,985,882 B1 | 1/2006 | Del Sesto |
| 6,993,534 B2 * | 1/2006 | Denesuk et al. ................. 1/1 |
| 7,039,599 B2 | 5/2006 | Merriman et al. |
| 7,136,853 B1 | 11/2006 | Kohda et al. |
| 7,136,875 B2 | 11/2006 | Anderson et al. |
| 7,139,732 B1 | 11/2006 | Desenberg |
| 7,146,560 B2 * | 12/2006 | Dang et al. ................. 715/204 |
| 7,162,471 B1 | 1/2007 | Knight et al. |
| 7,185,010 B2 | 2/2007 | Morinville |
| 7,231,358 B2 | 6/2007 | Singh et al. |
| 7,251,666 B2 | 7/2007 | Morinville |
| 7,346,606 B2 | 3/2008 | Bharat |
| 7,349,876 B1 | 3/2008 | Veach |
| 7,496,943 B1 | 2/2009 | Goldberg et al. |
| 7,499,874 B2 | 3/2009 | Singh et al. |
| 7,647,299 B2 | 1/2010 | Harik |
| 7,668,832 B2 | 2/2010 | Yeh et al. |
| 7,693,827 B2 | 4/2010 | Zamir et al. |
| 7,697,791 B1 | 4/2010 | Chan et al. |
| 7,698,266 B1 | 4/2010 | Weissman et al. |
| 7,707,053 B2 | 4/2010 | Veach |
| 7,716,161 B2 | 5/2010 | Dean et al. |
| 7,734,624 B2 | 6/2010 | Anderson et al. |
| 7,778,872 B2 | 8/2010 | Kamangar et al. |
| 7,792,698 B1 | 9/2010 | Veach et al. |
| 7,818,207 B1 | 10/2010 | Veach |
| 7,827,062 B2 | 11/2010 | Merriman et al. |
| 7,844,488 B2 | 11/2010 | Merriman et al. |
| 7,844,493 B1 | 11/2010 | Veach et al. |
| 7,873,536 B2 | 1/2011 | Desikan et al. |
| 2001/0037205 A1 | 11/2001 | Joao |
| 2001/0056374 A1 | 12/2001 | Joao |
| 2002/0013785 A1 | 1/2002 | Miyazaki et al. |
| 2002/0019831 A1 | 2/2002 | Wade |
| 2002/0032740 A1 | 3/2002 | Stern et al. |
| 2002/0046118 A1 | 4/2002 | Minte |
| 2002/0052928 A1 * | 5/2002 | Stern et al. ................. 709/218 |
| 2002/0082923 A1 | 6/2002 | Merriman et al. |
| 2002/0099600 A1 | 7/2002 | Merriman et al. |
| 2002/0103698 A1 | 8/2002 | Cantrell |
| 2002/0112155 A1 | 8/2002 | Martherus et al. |
| 2002/0120507 A1 | 8/2002 | Chanos et al. |
| 2002/0156779 A1 | 10/2002 | Elliott et al. |
| 2003/0023489 A1 | 1/2003 | McGuire et al. |
| 2003/0154406 A1 | 8/2003 | Honarvar et al. |
| 2005/0086244 A1 | 4/2005 | Morinville |
| 2005/0097188 A1 | 5/2005 | Fish |

OTHER PUBLICATIONS

Netz, et al., "Integrating Data Mining with SQL Databases: OLE DB for Data Mining", IEEE, Apr. 2001, pp. 379-387.

Thorpe, "Business Rule Exchange—the Next XML Wave", May 21-25, 2001, XML Europe 2001 Internationales Congress Centrum (ICC) Berlin, Germany.

Office Action (non-final) issued on Apr. 30, 2007 for U.S. Appl. No. 10/755,173.

Office Action (final) issued on Apr. 18, 2008 for U.S. Appl. No. 10/755,173.

Office Action (interview summary) issued on Jul. 25, 2008 for U.S. Appl. No. 10/755,173.

Office Action (non-final) issued on Oct. 2, 2008 for U.S. Appl. No. 10/755,173.

Office Action (non-final) issued on Nov. 21, 2007 for U.S. Appl. No. 10/852,406.

Office Action (final) issued on Aug. 13, 2008 for U.S. Appl. No. 10/852,406.

Office Action (interview summary) issued on Jan. 2, 2009 for U.S. Appl. No. 10/852,406.

Office Action (non-final) issued on Mar. 24, 2009 for U.S. Appl. No. 10/852,406.

U.S. Appl. No. 10/852,406, filed May 24, 2004.

U.S. Appl. No. 10/755,173, filed Jan. 9, 2004.

Notice of Allowance for U.S. Appl. No. 10/755,173, mailed Mar. 6, 2009.

Notice of Allowance for U.S. Appl. No. 10/755,173, mailed Jun. 26, 2009.

Interview Summary mailed Oct. 21, 2009 for U.S. Appl. No. 10/755,173.

Notice of Allowance for U.S. Appl. No. 10/755,173, mailed Dec. 17, 2009.

Office Action (non-final) issued Dec. 23, 2009 for U.S. Appl. No. 10/852,406.

Notice of Allowance for U.S. Appl. No. 10/852,406, mailed May 6, 2010.

U.S. Appl. No. 12/658,421, filed Feb. 11, 2010.

In the U.S. Patent and Trademark Office, Notice of Allowance in re: U.S. Appl. No. 10/755,173, dated Dec. 17, 2009, 6 pages.

In the U.S. Patent and Trademark Office, Notice of Allowance in re: U.S. Appl. No. 10/755,173, dated Jun. 26, 2009, 7 pages.

In the U.S. Patent and Trademark Office, Notice of Allowance in re: U.S. Appl. No. 10/755,173, dated Mar. 6, 2009, 4 pages.

In the U.S. Patent and Trademark Office, Office Action in re: U.S. Appl. No. 10/755,173, dated Oct. 2, 2008, 9 pages.

In the U.S. Patent and Trademark Office, Final Office Action in re: U.S. Appl. No. 10/755,173, dated Apr. 18, 2008, 7 pages.
In the U.S. Patent and Trademark Office, Office Action in re: U.S. Appl. No. 10/755,173, dated Apr. 30, 2007, 12 pages.
In the U.S. Patent and Trademark Office, Office Action in re: U.S. Appl. No. 12/658,421, dated Jan. 20, 2011, 14 pages.
In the U.S. Patent and Trademark Office, Notice of Allowance in re: U.S. Appl. No. 10/852,406, dated May 6, 2010, 6 pages.
In the U.S. Patent and Trademark Office, Office Action in re: U.S. Appl. No. 10/852,406, dated Dec. 23, 2011, 9 pages.
In the U.S. Patent and Trademark Office, Office Action in re: U.S. Appl. No. 10/852,406, dated Mar. 24, 2009, 13 pages.
In the U.S. Patent and Trademark Office, Final Office Action in re: U.S. Appl. No. 10/852,406, dated Aug. 13, 2008, 13 pages.
In the U.S. Patent and Trademark Office, Office Action in re: U.S. Appl. No. 10/852,406, dated Nov. 21, 2007, 16 pages.
Barroso et al., Web search for a planet: The Google Cluster Architecture, [online], IEEE Micro 23(2), Mar.-Apr. 22-28, 2003. Retrieved from the Internet: <URL: http://static.googleusercontent.com/external_13 content/untrusted_dlcp/labs.google.com/en/us/papers/googlecluster-ieee.pdf>, pp. 22-28.
Ghemawat et al., The Google File System, in Proc. 19th ACM Symp. on Operating Syst. Principles, Oct. 19-22, 2003. Retrieved from the Internet: <URL: http//static.googleusercontent.com/external_content/untrusted_dlcp/research.google.com/en/us/archive/gfs-sosp2003.pdf>, pp. 29-43.
Yagen, FTF#1 Jul. 18, 2001 Minutes, [online], Jul. 23, 2001. Message posted to xacml@lists.oasis-open.org, archived at and retrieved from the Internet: <URL: http://lists.oasis-open.org/archives/xacml/200107/msg00033.html>, pp. 1-11.
Pilz, XACML Draft-xtc-use-domain-01, [online], Jun. 7, 2001. Retrieved from the Internet: <URL: http://lists.oasis-open.org/archives/xacml/200106/doc00000.doc>, pp. 1-3.
Pilz, Domain model, Draft-xtc-use-domain-02, [online], Jun. 12, 2001. Retrieved from the Internet: <URL: http://lists.oasis-open.org/archives/xacml/200107/doc00000.doc>, pp. 1-5.
OASIS eXtensible Access Control Markup Language TC, Face to Face Meeting #1 of the XACML TC Agenda, [online], Updated Jul. 17, 2001. Retrieved from the Internet: <URL: http://www.oasis-open.org/committees/xacml/agendas/20010718-f2f1.shtml>, pp. 1-3.
Kudoh, [use case] revised document, [online], Sep. 4, 2001. Message posted to xacml@lists.oasis-open.org, archived at and retrieved from the Internet: <URL: http://lists.oasis-open.org/archives/xacml/200109/msg00003.html>, pp. 1-2.
Moses, Clinical Record Use Cases, [online], Sep. 4, 2001 [retrieved on Sep. 9, 2001]. Retrieved from the Internet: <URL: http://lists.oasis-open.org/archives/xacml/200109/pdf00001.pdf>, pp. 1-45.
OASIS eXtensible Access Control Markup Language TC, Face to Face Meeting 2 Agenda, [online], to be delivered Sep. 10, 2001. Retrieved from the Internet: <URL: http://www.oasis-open.org/committees/xacml/agendas/20010910-f2f2.shtml#minutes>, pp. 1-3.
Kudoh, Slides used in F2F#2, [online], Sep. 11, 2001. Message posted to xacml@lists.oasis-open.org, archived at and retrieved from the Internet: <URL: http://lists.oasis-open.org/archives/xacml/200109/msg00055.html>.
Kudoh, F2F 2 meeting slides Use Case and Requirement, [online], Sep. 10, 2011. Retrieved from the Internet: <URL: http://lists.oasis-open.org/archives/xacml/200109/bin00006.bin>, pp. 1-8.
Moses et al., XACML language proposal V. 0.4, [online], Nov. 5, 2001. Retrieved from the Internet: <URL: http://lists.oasis-open.org/archives/xacml/200111/doc00002.doc>, pp. 1-13.
Moses et al., XACML language proposal V. 0.6, [online], Nov. 23, 2001. Retrieved from the Internet: <URL: http://lists.oasis-open.org/archives/xacml/200111/doc00005.doc>, pp. 1-23.
Moses et al., XACML language proposal V. 0.7, [online], Nov. 27, 2001. Retrieved from the Internet: <URL: http://lists.oasis-open.org/archives/xacml/200111/doc00006.doc>, pp. 1-30.
Moses et al., XACML language proposal V. 0.8. [online], Jan. 10, 2002. Retrieved from the Internet: <URL: http://lists.oasis-open.org/archives/xacml/200201/doc00000.doc>, pp. 1-35.

Moses et al., draft-xacml-v0.9, [online], Feb. 14, 2002. Retrieved from the Internet: <URL: http://lists.oasis-open.org/archives/xacml/200202/doc00002.doc>, pp. 1-32.
Yagen, [xacml] XACML Feb. 21, 2002 Minutes, [online], Sep. 4, 2001. Message posted to xacml@lists.oasis-open.org, archived at and retrieved from the Internet: <URL: http://lists.oasis-open.org/archives/xacml/200202/msg00124.html>, pp. 1-5.
Moses et al., draft-xacml-v0.10, [online], Mar. 8, 2002. Retrieved from the Internet: <URL: http://lists.oasis-open.org/archives/xacml/200203/doc00000.doc>, pp. 1-35.
Lockhart, [xacml] Champions missing from F2F, [online], Mar. 7, 2002. Message posted to xacml@lists.oasis-open.org, archived at and retrieved from the Internet: <URL: http://lists.oasis-open.org/archives/xacml/200203/msg00014.html>, p. 1.
Moses et al., draft-xacml-v0.11, [online], Mar. 19, 2002. Retrieved from the Internet: <URL: http://lists.oasis-open.org/archives/xacml/200203/doc00002.doc>, pp. 1-41.
Adams, [xacml] Major milestone achieved, and next step . . . , [online], Mar. 28, 2002. Message posted to xacml@lists.oasis-open.org, archived at and retrieved from the Internet: <URL: http://lists.oasis-open.org/archives/xacml/200203/msg00112.html>, pp. 1-2.
Maclean, [xacml] RE: [xacml] XrML & XACML Review, [online], Apr. 1, 2002. Message posted to xacml@lists.oasis-open.org, archived at and retrieved from the Internet: <URL: http://lists.oasis-open.org/archives/xacml/200204/msg00000.html>, pp. 1-2.
Moses et al., draft-xacml-v0.12, [online], Apr. 2, 2002. Retrieved from the Internet: <URL: http://lists.oasis-open.org/archives/xacml/200204/doc00001.doc>, pp. 1-44.
Anderson, [xacml] Examples of J2SE Policy via XACML, [online], Apr. 19, 2002. Message posted to xacml@lists.oasis-open.org, archived at and retrieved from the Internet: <URL: http://lists.oasis-open.org/archives/xacml/200204/msg00130.html>, pp. 1-7.
Adams et al., Oasis XACML Technical Committee Meeting, [online], Apr. 22, 2002. Retrieved from the Internet: <URL: http://lists.oasis-open.org/archives/xacml/200205/doc00000.doc>, pp. 1-12.
Kudoh, [xacml] US Patent Application, [online], May 3, 2002. Message posted to xacml@lists.oasis-open.org, archived at and retrieved from the Internet: <URL: http://lists.oasis-open.org/archives/xacml/200205/msg00006.html>, pp. 1-2.
Moses et al., draft-xacml-v14, [online], Jun. 14, 2002. Retrieved from the Internet: <URL: http://lists.oasis-open.org/archives/xacml/200206/doc00000.doc>, pp. 1-57.
Erickson, Re: [xacml] Fundamental concepts in XACML, [online], Jun. 17, 2002. Message posted to xacml@lists.oasis-open.org, archived at and retrieved from the Internet: <URL: http://lists.oasis-open.org/archives/xacml/200206/msg00052.html>, pp. 1-3.
Anderson, [xacml] Commit to implement XACML?, [online], Jun. 25, 2002. Message posted to xacml@lists.oasis-open.org, archived at and retrieved from the Internet: <URL: http://lists.oasis-open.org/archives/xacml/200206/msg00090.html>, pp. 1-2.
Moses et al., draft-xacml-v15, [online], Jul. 12, 2002. Retrieved from the Internet: <URL: http://lists.oasis-open.org/archives/xacml/200207/doc00003.doc>, pp. 1-56.
Moses et al., draft-xacml-v16, [online], Aug. 22, 2002. Retrieved from the Internet: <URL: http://lists.oasis-open.org/archives/xacml/200208/doc00009.doc>, pp. 1-86.
Anderson, [xacml] RE: Conformance Tests, [online], Sep. 5, 2002. Forwarded message from John Howard. Message posted to xacml@lists.oasis-open.org, archived at and retrieved from the Internet: <URL: http://lists.oasis-open.org/archives/xacml/200209/msg00027.html>, pp. 1-3.
Moses et al., draft-xacml-v12, [online], Sep. 27, 2002. Retrieved from the Internet: <URL: http://lists.oasis-open.org/archives/xacml/200209/doc00002.doc>, pp. 1-113.
Moses et al., OASIS eXtensible Access Control Markup Language (XACML) Committee Specification 1.0, [online], Oct. 8, 2002. Retrieved from the Internet: <URL: http://lists.oasis-open.org/archives/xacml/200210/doc00000.doc>, pp. 1-117.
Moses et al., OASIS eXtensible Access Control Markup Language (XACML) Committee Specification 1.0, [online], Oct. 25, 2002. Retrieved from the Internet: <URL: http://lists.oasis-open.org/archives/xacml/200210/doc00004.doc>, pp. 1-121.

Best, [xacml] Re: XACML 1.0 approved as a Committee Specification! [online], Nov. 8, 2002. Message posted to xacml@lists.oasis-open.org, archived at and retrieved from the Internet: <URL: http://lists.oasis-open.org/archives/xacml/200211/msg00118.html>, pp. 1-3.

Adams, FW: ContentGuard IPR Declaration for OASIS re. XACML, [online], Nov. 26, 2002. Message posted to xacml@lists.oasis-open.org, archived at and retrieved from the Internet: <URL: http://lists.oasis-open.org/archives/xacml/200211/msg00189.html pp. 1-2.

Moses et al., OASIS eXtensible Access Control Markup Language (XACML) Committee Specification 1.0 (Revision 1), [online], Dec. 12, 2002. Retrieved from the Internet: <URL: http://lists.oasis-open.org/archives/xacml/200212/doc00001.doc>, pp. 1-129.

Lockhart, [xacml] Slides Presented to PRISM, [online], Jan. 9, 2003. Message posted to xacml@lists.oasis-open.org, archived at and retrieved from the Internet: <URL: http://lists.oasis-open.org/archives/xacml/200301/msg00005.html>, pp. 1.

Lockhart, (Power point Slides presented Dec. 11, 2002) eXtensible Access Control Markup Language (XACML), pp. 1-21.

"eXtensible Access Control Markup Language (XACML) Version 1.0", OASIS Standard, Feb. 18, 2003, 132 pages.

"OASIS eXtensible Access Control Markup Language (XACML)", Committee Specification 1.0, Nov. 7, 2002, 129 pages.

Carlisle Adams, "XACML 1.0 approved as a Commitee Specification", Nov. 8, 2002, 2 pages.

* cited by examiner

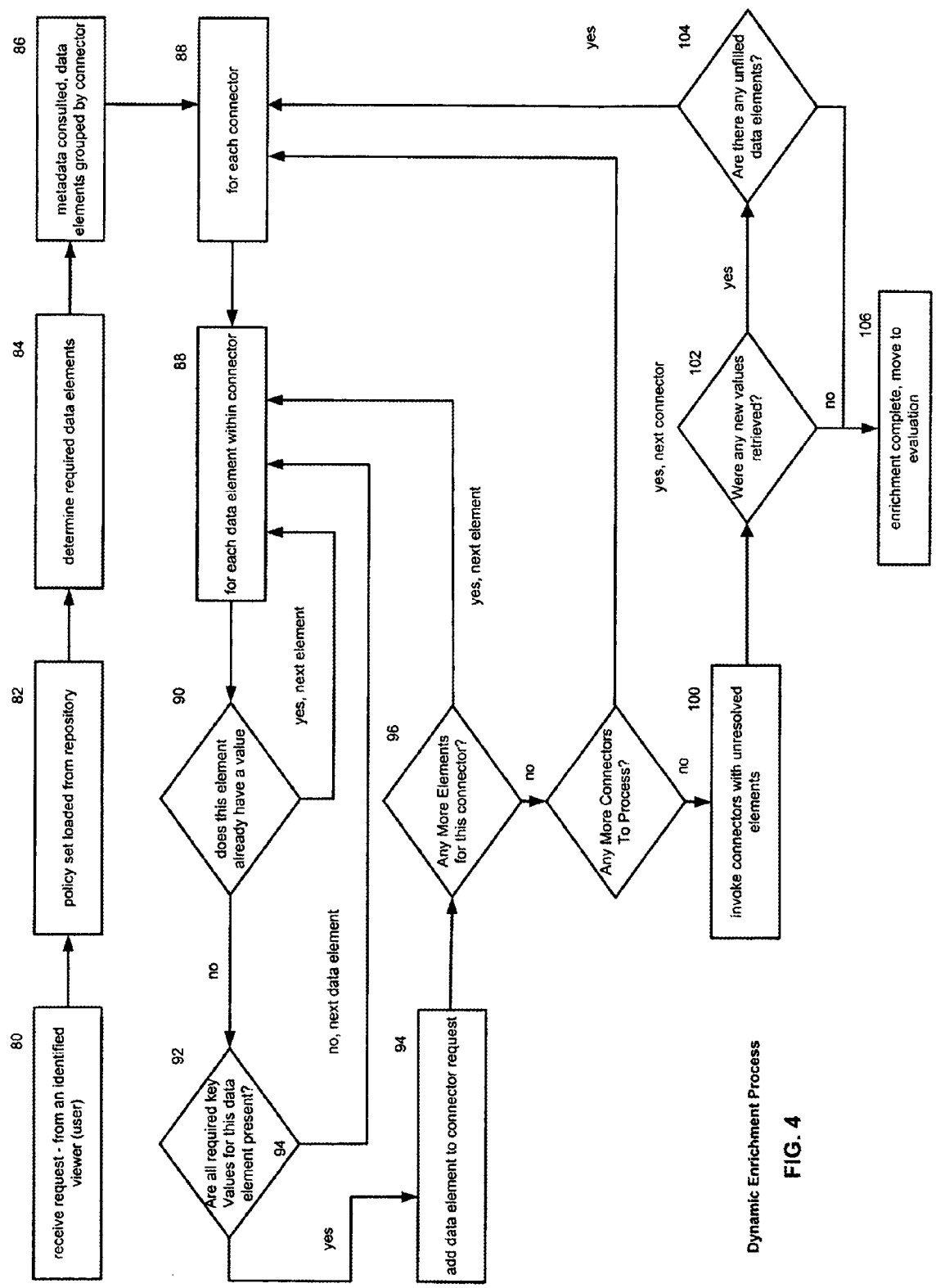

METHOD AND SYSTEM FOR SELECTING CONTENT ITEMS TO BE PRESENTED TO A VIEWER

RELATED APPLICATIONS

This application is a continuation of U.S. patent application Ser. No. 10/852,406 filed on May 24, 2004, now U.S. Pat. No. 7,792,828 which is incorporated herein by reference in its entirety and claims the benefit of priority to U.S. Provisional Patent Application No. 60/482,487, filed on Jun. 25, 2003, which is also incorporated herein by reference in its entirety. This application is related to and incorporates by reference U.S. Provisional Patent Application No. 60/438,972 filed Jan. 9, 2003 entitled, "Method and System for Dynamically Implementing an Enterprise Resource Policy," and U.S. patent application Ser. No. 10/755,173, filed Jan. 9, 2004 entitled, "System and Method For Dynamically Implementing an Enterprise Resource Policy."

TECHNICAL FIELD OF THE INVENTION

The invention relates to a system operable to select optimal content to be presented to a viewer, based upon both the characteristics of the viewer and the viewing situation.

BACKGROUND OF THE INVENTION

Over the last decade, technology has drastically improved the effectiveness of technology-based marketing. CRM systems have brought businesses back to their ancestral roots by providing organizations with a collective memory of every customer and their interactions. Previously, this was cost-prohibitive.

However, providing the optimal message to a customer is still a very cumbersome and time-consuming process. As a result, corporations have not fully benefited from the promise of real-time customized and personalized marketing. Many customized content and personalization initiatives remain undeveloped because of their prohibitive human and financial costs of implementation.

With the traditional targeted marketing paradigm, the seller initiates an interaction with the customer by analyzing historical data to segment customers offline and then "pushes" a message out to the customer. The seller then hopes for a response. However, other more proactive methods are desired.

SUMMARY OF THE INVENTION

The present invention provides a system and method to select, from a predefined palette of content items, those items which are best suited for an individual. This selection is based both on the attributes of the viewer and the context in which the contents is viewed. (i.e., at that precise moment in time). The content may involve advertisements, articles, or multimedia, such as animated images, movies, or audio clips.

More specifically, the present invention provides a centralized system that defines and manages business rules to identify what content is most relevant to the individual viewer's context. Then upon receipt of the content selection request, a centralized system evaluates the viewer's characteristics, the situational characteristics (context), and the viewer's personal history against the coded rules in order to select an optimal content set for display. Then the selected content is returned to a local system that serves the selected content to the viewer. Essentially, a number of diverse content items can be managed by the system, wherein each content item may have one or more coded rules which define the viewer and content in which content would be presented to the viewer.

In effect, each item of content has a rule which describes a "profile" of what an ideal viewer or presentation opportunity. When the content selection request is made, the coded rules associated with each relevant item are evaluated to determine if an appropriate viewing opportunity exists. If the rule is satisfied, the system then adds the content item, within a prioritized queue, to an aggregated body of content items for this presentation opportunity. The items are then sorted, by descending priority, with the most significant items being returned for presentation. The prioritized list is returned based on the results of evaluating the individual content items against various business rules. This produces a prioritized list of items most suitable for presentation to the viewer in the viewer's current viewing context.

Several advantages are provided. First, the ability to perform the evaluation process in real time, at the moment of the request is a significant advantage over existing systems. This allows the content selected to be sensitive to the current presentation opportunity rather than the data warehouse intensive traditional model which selects content days, and even weeks, beforehand. The present invention may also couple to enterprise data sources, customer care systems, and external data sources such as credit scoring bureaus, etc. to provide a very rich palette of information on which to base the content selection rules.

A detailed log of each request made, along with any/all content items selected for presentation, provides for auditability and effectiveness metrics, as well as inputs for a "feedback loop" in which future presentation opportunities can be made based on prior decisions. For example, a rule could be constructed such that an individual item of content would be highly prioritized under default conditions, but would be deprioritized in favor of other content items after the original item had been presented to a viewer. One implementation may reduce an item's priority after the item has been viewed three times in a 24-hour period.

An advantage of the present invention is that the rules defining the optimal presentation opportunity do not need to be maintained in executable code by the administrator or user. The rules are captured in a representative notational format via a rule-builder GUI application, and then stored in an XML encoded structure within repository. As they are not a part of the presentation engine (such as a web server), they can be changed at will without the need to update or test the web server or HTML source for the web pages the content is to be presented in. The items of content are managed in a hierarchical model, with each item inheriting characteristics from its parent to determine who may manipulate or change the rules which determine the rule's behavior unless a specific rule is established for the individual item. Ultimately, this allows the rules to be administered in a distributed fashion throughout an enterprise, or even to clients (usually advertisers) and business partners if the situation warrants such.

The invention can be invoked via a number of methods, including a J2EE compliant API library, a procedural interface suitable for linking into legacy applications written in C, COBOL, FORTRAN, etc., a Web Services interface, a C+ interface, or even a custom-developed API for an individual customer's needs.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 4 is a logic flow diagram providing a Dynamic Enrichment Process that depicts utilizing the rules engine to determine whether all of the data elements required to evaluate the rule are available.

DETAILED DESCRIPTION OF THE INVENTION

Preferred embodiments of the present invention are illustrated in the FIGUREs, like numerals being used to refer to like and corresponding parts of the various drawings.

Figure 1:
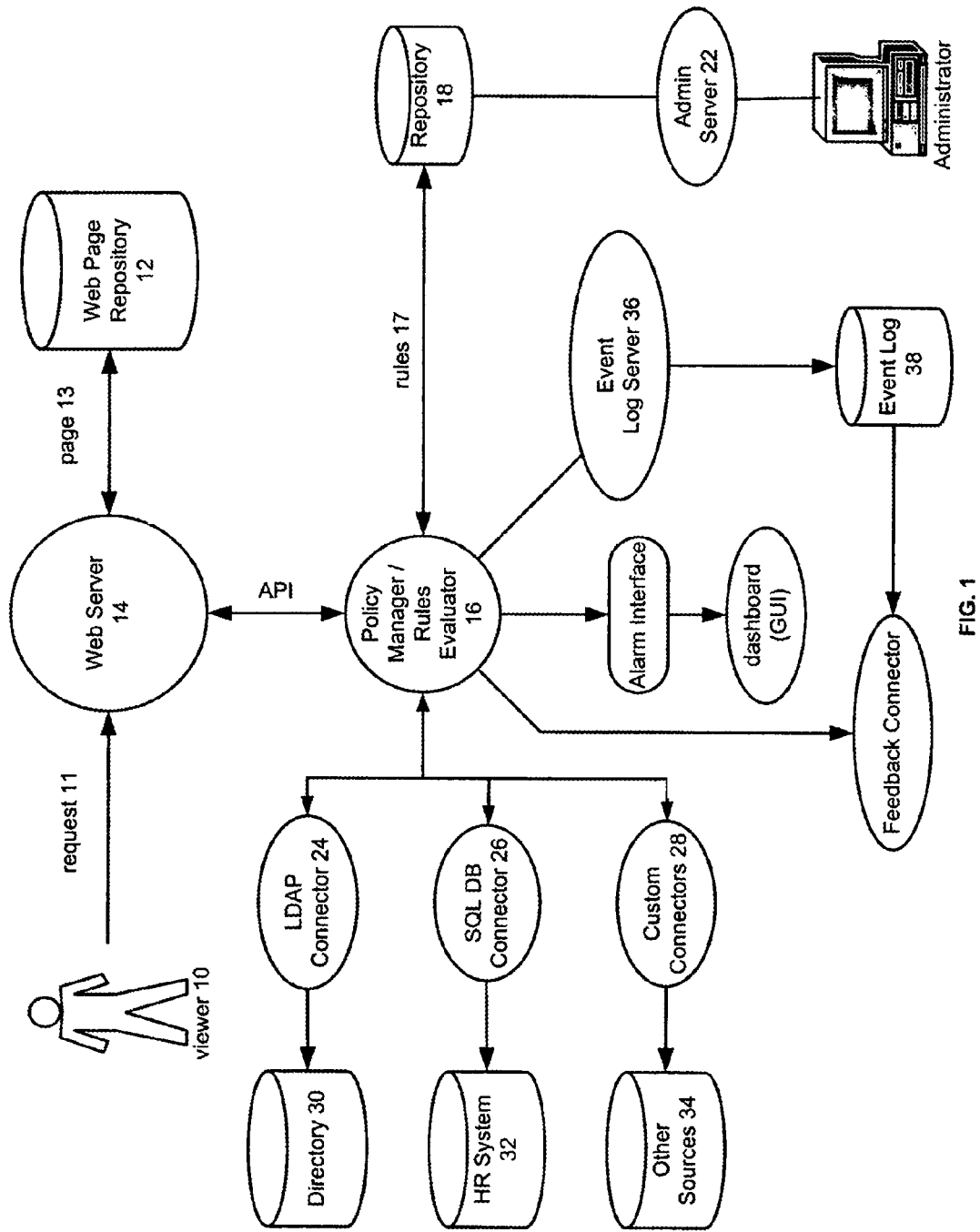
FIG. 1 depicts one basic implementation model to provide optimal content item for a particular viewer of a website.

One potential architecture for the use with the invention is depicted in FIG. 1. Here, user or viewer 10 requests a page of content from web server 14. Viewer 10 may have previously established his identity by authenticating in some fashion with web server 14. Alternatively, viewer 10 may be treated as having a default or anonymous identity.

Web server 14 loads page 13 from web page repository 12. Then web server 14 executes java servlets or other like instructions that are contained within page 13. The servlets invoke services application programming interface (API) which places a remote procedure call (RPC) into policy manager 16. This RPC requests content specifically chosen for viewer 10. Request 11 contains both the identity of viewer 10 and information that defines the set of rules and content items to be selected from a campaign or set of related content items.

Policy manager 16 uses a name associated with the campaign or set of related content item to retrieve a set of rules 17 from rules repository 18. Policy manager 16 then examines rules 17 to determine what additional information or data elements are required to evaluate rules 17.

Policy manager 16 invokes any/all connectors required, including but not limited to LDAP connector 24, SQL DB connector 26 and custom connector 28 to retrieve the information or data elements required to evaluate rules 17. These data elements may be within directory database 30, HR system database 32 and other data sources 34. These data sources return the data elements needed to policy manager 16.

Policy manager 16 enriches the decision context with the information retrieved. Policy manager 16 then evaluates the rules and creates an aggregated list of the content items associated with any/all rules whose criteria are met. Policy manager 16 then sorts the aggregated list in order of descending priority. The top "n" items of content ("n" being a number of items parameter passed on the ESAPI request), are selected and returned to web server 14 as the resultant of the ESAPI request. The web server then inserts those return content items into page 13, which may take the form of an HTML document. The customized page is then presented to viewer 10 via a web browser or other like application.

Event log 36 may track every transaction created and stored within repository 38. The information within event log 36 can provide the basis of metrics determining system usage and effectiveness as well as providing the inputs and capability on which to modify rules 17. For example, upon such information may include how many times a particular item has been presented to a specific viewer in a defined time interval.

Figure 2:
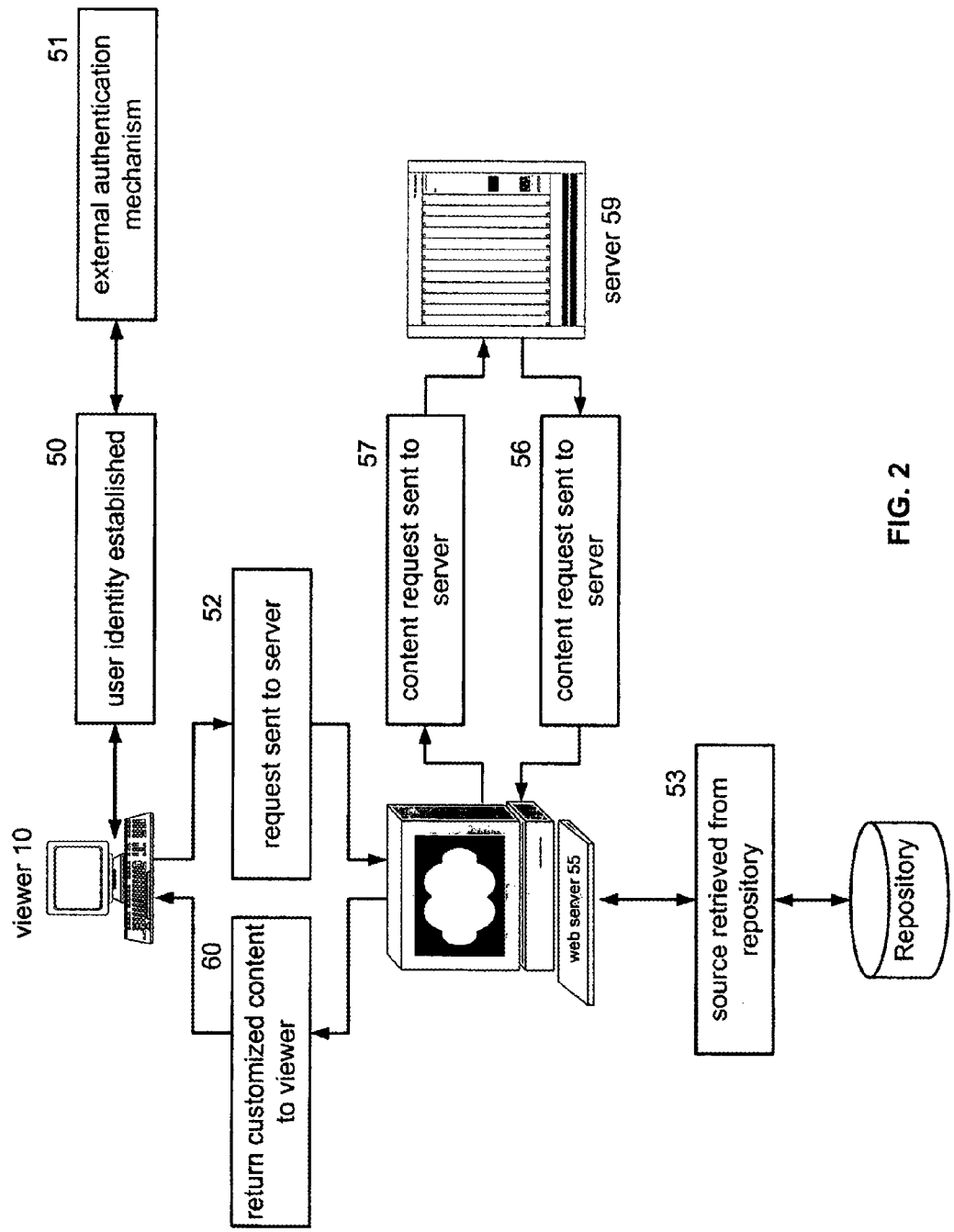
FIG. 2 provides a logical flow diagram relating to processing a content selection request.

FIG. 2 provides a process flow diagram that depicts the logical flow of web content request. The processing of a request to select content items for a viewer. In step 50, viewer 10 establishes their identity by authentication through a means such as external authentication mechanism 51. Next, a request is sent to web server 55 for a document in step 52.

In step 53, the document source is retrieved from the source repository, whereupon the web server executes instructions embedded within the document. Those instructions then invoke a services API in step 57 to request content from server 59. Optimal content is returned to web server 59 in step 56. Instructions within the document are then replaced with content. Then in step 60, web server 55 delivers the customized page to the user's browser for display.

Figure 3:
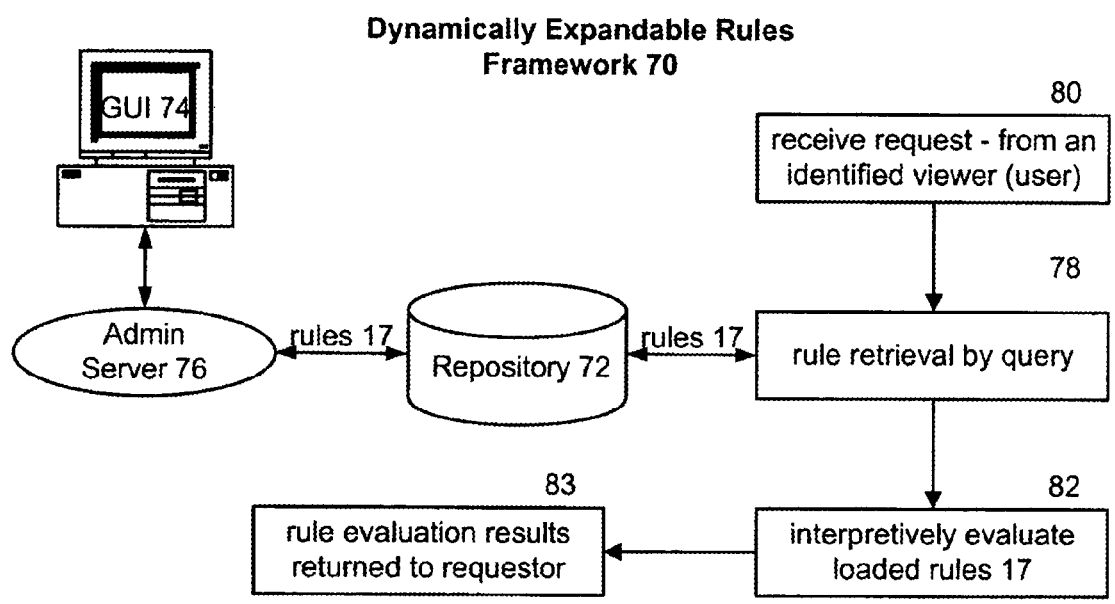
FIG. 3 is a diagram of the Dynamically Expandable Rules Framework that describes a process, implemented in code, by which invocation of a service can be made both enabled for parallel scaling and tolerant of failure of components in accordance with the present invention.

FIG. 3 depicts dynamically extensible rules management and evaluation framework 70. Rules evaluation engine is based upon the concept of using a process by which a policy is expressed as a rule, encoded in a machine-independent rules modeling language. The rule can be dynamically loaded from the repository 72 and evaluated upon demand within multiple execution contexts simultaneously. This provides for parallel scaling and fault tolerant capabilities. As the rules are loaded dynamically at evaluation time, rules may be created and/or changed at will, and will take effect upon the next evaluation request.

In FIG. 3, GUI 74 allows administrative users to access rules 17 stored within repository 72. GUI 74 also facilitates the ability of administrative users to create and modify coded rules based on business rules. GUI 74 interacts with repository 72 through server 76. The coded rules corresponding to the business rules are stored within repository 72. These rules 17 determine what content will be eligible to be presented to a viewer as previously described in FIGS. 1 and 2.

Rules 17 are retrieved from repository 72 following receipt of a content selection request that corresponds to query 78 that is received via web server 14 via input from user 10 through web server 14. Rules 17 are dynamically loaded and interpretively evaluated within process 82 wherein the results of this evaluation are returned to web server 14 or other requesting application in order to present the optimum content to a viewer.

The concept of dynamic enrichment of the data is available within the decision context depicted in FIG. 4. The dynamic enrichment process involves receiving a request in step 80. In step 82, in response to the request, a policy set is loaded from repository in step 82. The policy set is analyzed to determine the required data elements in step 84. In step 86, metadata is consulted and data elements are grouped by connector. For each connector a determination is made in step 88 for data for each data element within the connector. This involves determining whether or not each data element already has a value at decision point 90. If it does, an evaluation is made for the next data element. If not, a determination is made a decision point 92 as to whether or not all required key values for this data element are present. If all the required key values for this data element are present the data element is added to the connector request in step 94, otherwise, a determination is made for the next data element. In decision point 96, a determination is made as to whether or not additional data elements are required for this data connector. If additional elements are required the next data element is evaluated returning to step 96. Otherwise, at decision point 98, a determination is made as to whether or not any more connectors remain to be processed. Additional connectors are processed as described above. Otherwise, the connectors with unresolved elements are invoked at step 100 in order to retrieve identified additional data elements. At decision point 102, a determination is made as to whether or not any new values were retrieved. If there were, at decision point 104, a determination is made as to whether any unfilled data elements remain in which case the process is repeated by returning to step 88 until no unfilled data elements remain as indicated at point 106. Essentially, feature allows the rules engine to determine when all the data elements required to evaluate the policy are present. If the answer is no, then the rules engine may, through connectors, map to and retrieve all requisite data elements before evaluating the rule.

Figure 5A:
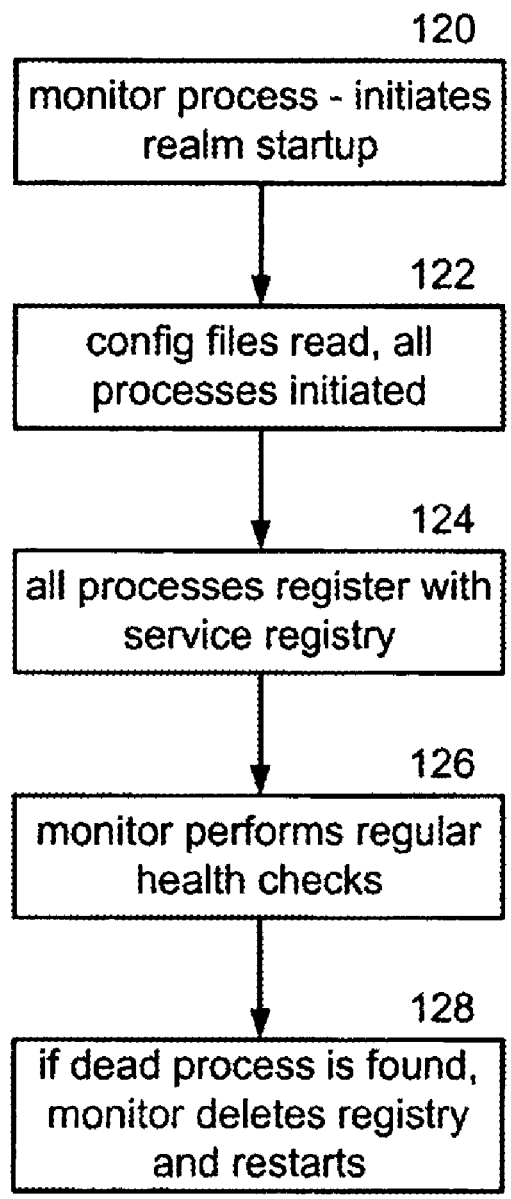
FIGS. 5A and 5B depict a Parallel Fault Tolerant Architecture that enables the invention to dynamically scale effectively across multiple servers and/or platforms while continuously servicing requests from the users/viewers.
Figure 5B:
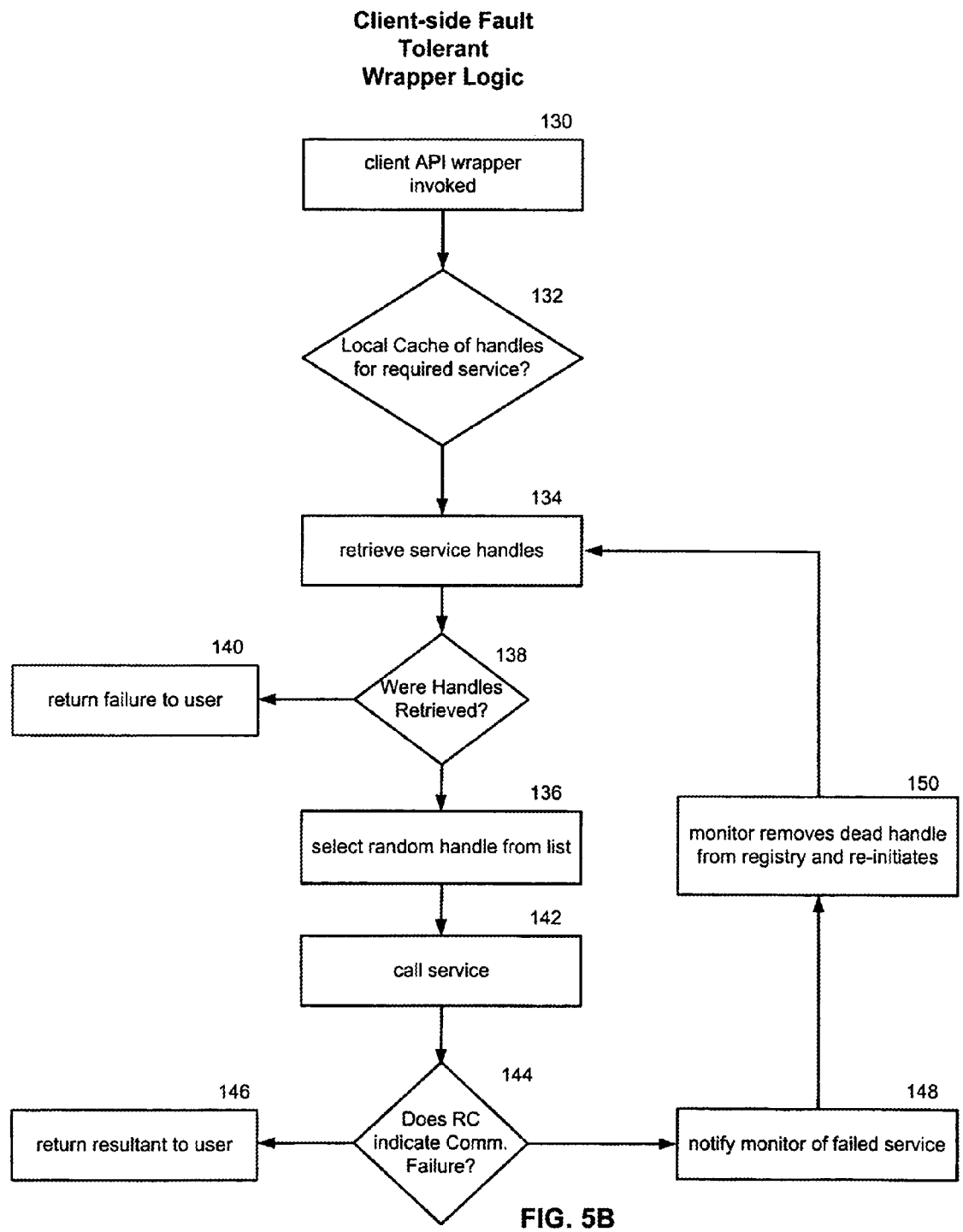

A diverse, fault tolerant architecture that enables effectively sealing across multiple servers and/or platforms while continuously servicing content selection requests is depicted in FIGS. 5A and 5B. This architecture effectively operates even when a multiple server loss occurs.

FIG. 5A depicts the process of realm startup. At step 120, the realm startup process is initiated. In step 122, all of the configuration files are read and associated processes are initiated. These processes are all registered with the service registry in step 124 after which the monitor performs regular health checks at predetermined intervals in step 126. If a dead process is found, the monitor deletes the registry and restarts the process in step 128.

FIG. 5B depicts client side fault tolerant wrapper logic. Here, in step 130 a client API wrapper is invoked. At decision point 132, a determination as to whether or not local cache of handles is required for service. If not required for service, the service handles are retrieved in step 134. Otherwise, a random handle is selected from an available list in step 136. Returning to retrieving service handles, decision point 138 evaluates whether or not handles were retrieved. If they were not, a return failure is made to the user in step 140. Otherwise, we progress to step 136 where the random handles are selected from the list. In step 142, a service call is initiated, after which at decision point 144, a determination is made as to whether or not a communication failure is indicated. If no communication failure is indicated, the resultant is returned to the user in step 146. Otherwise, the monitor is notified of failed service. In step 148, the dead handles are removed from the registry and reinitiating begins in step 150, after which the process returns to step 134.

The current implementation of this concept is built upon a Java infrastructure, and utilizes a number of fairly obscure features of the Java language to facilitate the service. The two most prominent of these are the concept of a dynamic class loader, and HTTP/XML RPC architecture used to manage the interaction between processes.

It is important to note that while one embodiment is implemented in the Java language, the concepts that distinguish the present invention are notably not Java specific, and in no way should the claims be restricted to the Java language or the platforms on which it runs. In a procedural language such as C/C++, PL/1, etc. the same concepts could readily be implemented through the use of dynamically shared libraries or through dynamic overlay methods that are well defined and commonplace.

While the embodiments discussed above focus on serving content to a web server, the present invention may also service other delivery mechanisms such as a Voice Response Unit (VRU), a wireless device such as a pager or cell phone, etc.

Although the present invention is described in detail, it should be understood that various changes, substitutions and alterations can be made hereto without departing from the spirit and scope of the invention as described by the appended claims.

What is claimed is:

1. A centralized system to select particular content items to be presented to a viewer from a plurality of content items, comprising:
   a coded rule associated with each particular content item;
   a server operable to:
   receive a content selection request;
   execute a rules engine, wherein the rules engine is operable to evaluate a plurality of coded rules in parallel, in order to determine particular content items the viewer is eligible to receive in response to the content selection request;
   support a graphical user interface (GUI) operable to facilitate building and managing the coded rules;
   maintain an application program interface (API) library operable to manage communications between a requesting service and the rules engine;
   interface with an information retrieval facility operable to retrieve information required to evaluate the coded rules; and
   maintain an integrated usage and audit log operable to provide metrics and a feedback process, wherein the integrated usage and audit log allow the coded rules to be dependent upon prior behaviors of the viewer.

2. The centralized system of claim 1, wherein the server is further operable to log and track each content selection request.

3. The centralized system of claim 1, wherein the server is further operable to:
   determine additional information required to evaluate the coded rules;
   locate the additional information required to evaluate the coded rules;
   extract the additional information required to evaluate the coded rules; and
   retrieve the additional information required to evaluate the coded rules.

4. The centralized system of claim 3, wherein the server evaluates the content selection request in real time with the additional information required to evaluate the coded rules.

5. The centralized system of claim 1, wherein the coded rules associated with the content selection request are operable to be updated and immediately activated.

6. The centralized system of claim 5, wherein ownership of the coded rule associated with the content selection request has distributed administrative ownership and control.

7. The centralized system of claim 1, wherein the server is further operable to generate an alarm based upon the evaluation of the content selection request in real time, wherein the alarm is sent to an appropriate location.

8. The centralized system of claim 1, wherein a rule repository is operable to store the coded rules.

9. A method to select particular content items to be presented to a viewer from a plurality of content items, comprising:
   receiving a content selection request for content items to be presented to a viewer from a requesting system;
   identifying the viewer with an authenticated identity or an anonymous identity associated with the content selection request;

retrieving a coded rule associated with the content selection request corresponding to a set of related content items;

determining data elements required to evaluate the content selection request;

retrieving the identified data elements required to evaluate the content selection request;

evaluating, by a server, the content selection request in real time to determine a resultant set of content items;

prioritizing the resultant set of content items; and providing at least one content item from the prioritized resultant set of content items to the requesting system.

10. The method of claim 9, wherein each content item is associated with a coded rule.

11. The method of claim 9, further comprising determining a data source comprising at least one of the identified data elements and requesting the at least one of the identified data element from the data source.

12. The method of claim 11, wherein the determining a data source comprising at least one of the identified data elements and requesting the at least one of the identified data element from the data source is server performed.

13. The method of claim 11, wherein the data source is an external data source.

14. The method of claim 9, wherein the retrieving a coded rule associated with the content selection request corresponding to a set of related content items is server performed.

15. The method of claim 9, wherein the providing at least one content item from the prioritized resultant set of content items to the requesting system is server performed.

16. The method of claim 9, wherein the
receiving a content selection request for content items to be presented to a viewer from a requesting system is server performed.

17. The method of claim 9, further comprising:
logging each content selection request;
tracking each content selection request;
logging each data element required to evaluate each content selection request; and
tracking each data element required to evaluate each content selection request.

18. The method of claim 9, wherein prioritizing the identified set of content items comprises ranking of the identified set of content items by at least one means selected from the group consisting of predefined static priorities, correlation to statistical models, derived priorities set by external data interfaces, priorities modified by rules-based exclusivity or random-distribution operations, and combinations thereof.

19. The method of claim 9, wherein coded rules are created and deployed with a graphical user interface (GUI), wherein the GUI allows an administrator to specify business rules that determine content presentation eligibility.

20. The method of claim 9, further comprising updating coded rules based on an intelligent feedback process in which the results and effectiveness of individual and/or aggregate presentations of selected content items are analyzed to refine the coded rules.

21. The method of claim 9, further comprising:
determining additional data elements required to evaluate content selection request against coded rules;
locating the additional data elements;
extracting the additional data elements; and
retrieving the additional data elements.

22. The method of claim 21, further comprising evaluating the content selection request in real time with the additional data elements.

23. The method of claim 9, wherein coded rules associated with a campaign defined in the content selection request are capable of being modified and immediately implemented.

24. The method of claim 23, wherein ownership of coded rules has distributed administrative ownership and control.

* * * * *